US008482786B2

(12) United States Patent
Ozawa

(10) Patent No.: US 8,482,786 B2
(45) Date of Patent: Jul. 9, 2013

(54) IMAGE FORMING APPARATUS FOR REUSING PAPER AND RELATED METHODS

(75) Inventor: Shogo Ozawa, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 860 days.

(21) Appl. No.: 12/611,642

(22) Filed: Nov. 3, 2009

(65) Prior Publication Data

US 2010/0118349 A1  May 13, 2010

Related U.S. Application Data

(60) Provisional application No. 61/112,624, filed on Nov. 7, 2008, provisional application No. 61/114,026, filed on Nov. 12, 2008.

(51) Int. Cl.
*G06K 15/00* (2006.01)

(52) U.S. Cl.
USPC ............... 358/1.18; 358/1.9; 399/43; 399/45; 347/179

(58) Field of Classification Search
USPC ............ 358/1.9, 1.18, 500, 505; 399/16, 399/43, 45; 347/179
See application file for complete search history.

(56) References Cited

U.S. PATENT DOCUMENTS

| 4,939,669 | A | * | 7/1990 | Nishino | 358/1.18 |
|---|---|---|---|---|---|
| 5,606,158 | A | * | 2/1997 | Takemoto et al. | 235/380 |
| 5,629,777 | A | | 5/1997 | Moro | |
| 6,753,977 | B2 | * | 6/2004 | Hoover | 358/1.9 |
| 2004/0080787 | A1 | * | 4/2004 | Kakikawa et al. | 358/1.18 |
| 2005/0034068 | A1 | * | 2/2005 | Jaeger | 715/517 |
| 2005/0141906 | A1 | * | 6/2005 | Murakami | 399/45 |
| 2007/0236720 | A1 | * | 10/2007 | Tamada et al. | 358/1.14 |
| 2009/0021762 | A1 | | 1/2009 | Saito | |

FOREIGN PATENT DOCUMENTS

| JP | 6-155906 A | 6/1994 |
|---|---|---|
| JP | 8-46786 A | 2/1996 |
| JP | 10-88046 A | 4/1998 |
| JP | 11-268409 A | 10/1999 |
| JP | 2001-209284 A | 8/2001 |
| JP | 2005-94413 A | 4/2005 |
| JP | 2007-178527 A | 7/2007 |

* cited by examiner

*Primary Examiner* — King Poon
*Assistant Examiner* — Jamares Q Washington
(74) *Attorney, Agent, or Firm* — Patterson & Sheridan, LLP

(57) ABSTRACT

An image forming apparatus acquires a print target image, scans an image on a sheet, recognizes reuse information in the image scanned from the sheet, generates reuse information after printing the print target image from the recognized reuse information and the acquired print target image, selects an area where the reuse information can be printed, in the acquired print target image, combines the reuse information with the selected area in the print target image, deletes the image on the sheet from which the image is scanned, and forms the combined image on the sheet from which the image is deleted, with a erasable image forming material.

19 Claims, 5 Drawing Sheets

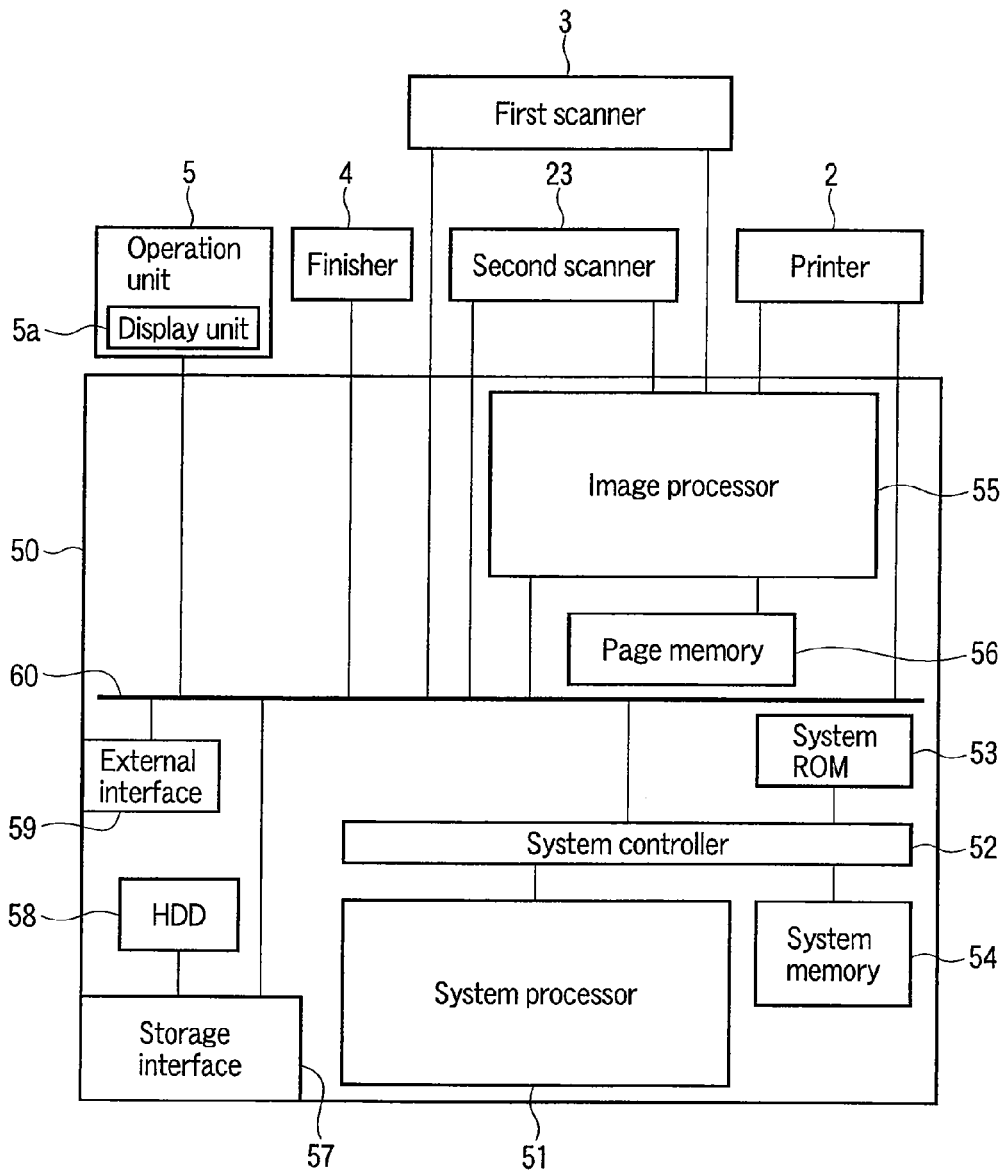
F I G. 3

IMAGE FORMING APPARATUS FOR REUSING PAPER AND RELATED METHODS

CROSS-REFERENCE TO RELATED APPLICATION

This application claims the benefit of U.S. Provisional Applications No. 61/112,624, filed Nov. 7, 2008; and No. 61/114,026, filed Nov. 12, 2008.

TECHNICAL FIELD

The present invention relates to an image forming apparatus which forms an image with a erasable image forming material and deletes an image formed with a erasable image forming material.

BACKGROUND

Conventionally, an image forming apparatus employs an electrographic system, an ink jet system, a thermal recording system, a heat transfer system or the like, as its printing system. Recently, methods of reusing sheets used for a printer are proposed in order to reduce environmental burdens or to reduce carbon dioxide emissions. For example, JP-A-6-155906 proposes a system of rewriting images many times by using a thermally colorable or decolorable sheet. JP-A-11-268409 proposes a system of thermally deleting an image on a sheet that is printed with decolorable toner and thereby enabling reuse of the sheet. JP-A-10-88046 proposes a system of thermally deleting an image on a sheet that is printed with decolorable ink and thereby enabling reuse of the sheet. In any of these systems, a reused sheet gradually deteriorates in quality if the deletion of the image is repeated. The sheet with deteriorated quality may not be used as a medium for forming an image thereon.

JP-A-2001-209284 discloses a technique of printing, on a sheet, reuse information about reuse together with an image to be printed with erasable ink. In the technique disclosed in JP-A-2001-209284, an area in which printing of an image is disabled (non-printable area) is set on a sheet and reuse information is printed in the non-printable area. However, in the technique disclosed in JP-A-2001-209284, the area in which an image as a print target can be printed is reduced in order to secure the non-printable area on the sheet. Moreover, in the technique disclosed in JP-A-2001-209284, since the size of the non-printable area is changed, an image as desired by a user may not be printed on the sheet even if an image for printing is prepared in accordance with the sheet size.

JP-A-2001-209284 also discloses a technique of printing the remaining number of times of printing as reuse information. However, the remaining number of times of printing disclosed in JP-A-2001-209284 shows the value acquired by counting down from the limit number of times of reuse every time printing is carried out once. That is, in JP-A-2001-209284, the remaining number of times of printing is decided irrespective of the print rate on the sheet or the characteristics of the image forming material (ink or toner). Therefore, the remaining number of times of printing may not correspond to the actual damage to the sheet.

SUMMARY

An image forming apparatus according to an aspect of the invention includes: an image acquisition unit which acquires a print target image; a scanner which scans an image on a sheet; a recognition unit which recognizes reuse information from the image scanned by the scanner; a generation unit which generates reuse information after printing the print target image on the basis of the reuse information recognized by the recognition unit and the print target image acquired by the image acquisition unit; a selection unit which selects an area where the reuse information generated by the generation unit can be printed, in the print target image acquired by the image acquisition unit; a combination unit which combines the reuse information generated by the generation unit with the print target image on the basis of the area selected by the selection unit; a deletion unit which deletes the image on the sheet from which the image is scanned by the scanner; and an image forming unit which forms the combined image created by the combination unit on the sheet from which the image is deleted by the deletion unit, with a erasable image forming material.

A control method for an image forming apparatus according to another aspect of the invention includes: acquiring a print target image; scanning an image on a sheet; recognizing reuse information in the image scanned from the sheet; generating reuse information after printing the print target image on the basis of the recognized reuse information and the acquired print target image; selecting an area where the reuse information can be printed, in the acquired print target image; combining the reuse information with the print target image on the basis of the selected area; deleting the image on the sheet from which the image is scanned; and forming the combined image on the sheet from which the image is deleted, with a erasable image forming material.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing an exemplary configuration of a control system of a digital multi-function peripheral.

DETAILED DESCRIPTION

Hereinafter, embodiment of the invention will be described in detail with reference to the drawings.

First, an exemplary configuration of an image forming apparatus according to this embodiment will be described.

Figure 1:
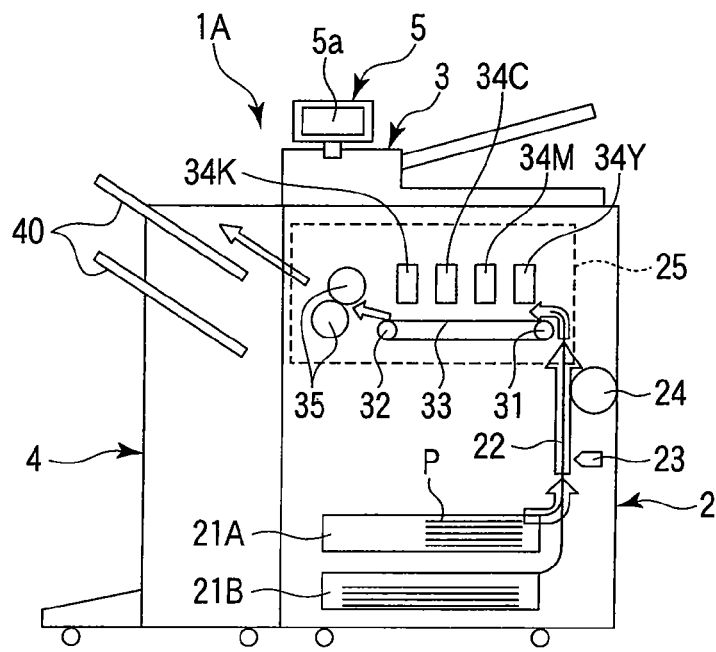
FIG. 1 shows an exemplary configuration of a digital multi-function peripheral.
Figure 2:
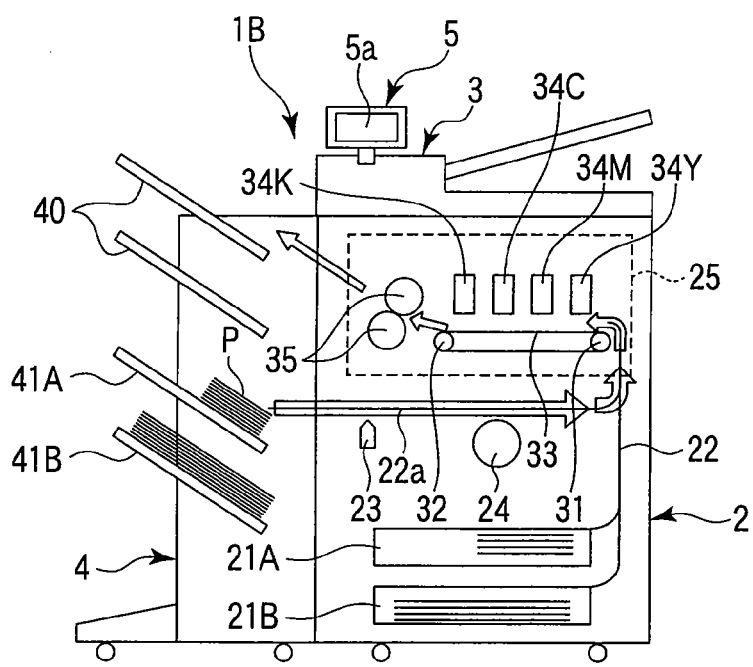
FIG. 2 shows an exemplary configuration of a digital multi-function peripheral.

FIG. 1 and FIG. 2 shows an exemplary configuration of a digital multi-function peripheral 1 (1A, 1B) as an image forming apparatus. The digital multi-function peripheral 1 shown in FIG. 1 and FIG. 2 has a printer 2, a scanner 3, and a finisher 4.

The printer 2 prints an image on a sheet with a erasable image forming material. The printer 2 also has the function of deleting an image formed on a sheet with a erasable image forming material. The scanner (first scanner) 3 scans an image of an original. For example, in the case of copying, an image of an original scanned by the scanner 3 is image data of a print target. The finisher 4 processes a sheet on which an image is formed by the printer 2. The finisher 4 may have a paper supply machine that supplies a sheet to be reused by having an image thereon deleted (erased), to the printer, as in the exemplary configuration shown in FIG. 2. An operation unit 5 is a user interface through which an operation instruction from the user is inputted.

The operation unit 5 has a display unit 5a having, for example, hard keys such as ten keys and a built-in touch panel. The display unit 5a of the operation unit 5 displays an operation guide or touch keys (icons) that can be selected on the touch panel. For example, the operation unit 5 detects that a touch key (icon) displayed on the display unit 5a is touched by the user, via the touch panel. The display unit 5a of the operation unit 5 also displays a guide showing that the printing is possible, together with the operation guide. If there is a print error, the display unit 5a displays a guide showing the content of the error.

The printer 2 has a cassette 21 (21A, 21B), a carrying mechanism 22, a scanner (second scanner) 23, a deletion unit 24, and an image forming unit 25, as shown in FIG. 1 and FIG. 2.

The cassette 21 is a cassette housing sheets. The cassette 21 houses sheets P for printing on which an image is printed by the printer 2. The cassettes 21A and 21B can house different kinds of sheets from each other. For example, the digital multi-function peripheral 1A shown in FIG. 1 can employ an application in which the cassette 21A houses sheets to be reused (sheets on which a erasable image is printed) and the cassette 21B houses new sheets.

The carrying mechanism 22 carries a sheet within the printer 2. The carrying mechanism 22 picks up one sheet from the cassette 21. In the digital multi-function peripheral 1A shown in FIG. 1, the carrying mechanism 22 carries the sheet picked up from each cassette 21, to the scanner 23, the deletion unit 24 and the image forming unit 25 in this order.

The digital multi-function peripheral 1B shown in FIG. 2 further includes a carrying mechanism 22a which carries a sheet that is supplied from a paper supply tray 41 (41A, 41B) of the finisher 4 to the printer 2. The carrying mechanism 22a carries the sheet supplied from the finisher 4, to the scanner 23, the deletion unit 24 and the image forming unit 25 in this order. In the digital multi-function peripheral 1B, the carrying mechanism 22 carries the sheet picked up from the cassette 21 to the image forming unit 25. In the digital multi-function peripheral 1B shown in FIG. 2, it is assumed that a sheet to be reused (a sheet on which a erasable image is printed) is supplied from the paper supply tray 41 (41A, 41B) of the finisher 4 and the cassettes 21A and 21B house new sheets.

The scanner (second scanner) 23 scans an image on a sheet. The scanner 23 can be any scanner that scans an image formed with a erasable image forming material on a sheet supplied from the cassette 21 or the tray 41. The scanner 23 scans reuse information, which will be described later, together with the image printed on the sheet.

The deletion unit 24 deletes (erases) an image formed on a sheet with a erasable image forming material. The deletion unit 24 has a deletion mechanism corresponding to the characteristics of the image forming material that should be deleted. For example, a deletion mechanism for deleting an image formed with ink which is deleted by heating includes a heating head or the like which heats the sheet. The deletion mechanism used in the deletion unit 24 may also be a mechanism which scrapes the image forming material off the sheet or paints over the sheet surface in solid white.

The image forming unit 25 forms an image on a sheet. For example, the image forming unit 25 forms an image using a erasable image forming material. In the exemplary configurations shown in FIG. 1 and FIG. 2, the image forming unit 25 is an ink jet printer. However, the image forming unit 25 may be any image forming unit that forms an image with a erasable image forming material. For example, the image forming unit 25 can also be realized by an electrographic printer (laser printer) or a thermal transfer printer.

In the exemplary configurations shown in FIG. 1 and FIG. 2, the image forming unit 25 has a registration roller 30, a driven roller 31, a driving roller 32, a carrying belt 33, ink jet heads 34 (34Y, 34M, 34C, 34K), carrying rollers 35 and so on.

The registration roller 30 sends out a sheet carried by the carrying mechanism 22, in desired timing. The driven roller 31 and the driving roller 32 support the carrying belt 33. The driving roller 32 and the driven roller 31 give tension to the carrying belt 33. The carrying belt 33 is driven as the driving roller 32 rotates. The carrying belt 33 carries a sheet while sucking the sheet. For example, on the inner side of the carrying belt 33 having holes opened therein, a negative-pressure chamber is installed which is connected to a fan for sucking the sheet.

The ink jet head group 34 includes an ink jet head 34Y, an ink jet head 34M, an ink jet head 34C, and an ink jet head 34K (Bk). The ink jet heads 34Y, 34M, 34C and 34K function as image forming units that form images of the corresponding colors. The carrying rollers 35 discharge a sheet on which an image is printed by the ink jet head group 34 to a paper discharge tray 40 provided in the finisher 4.

The ink jet heads 34Y, 34M, 34C and 34K are installed in order along the carrying belt 33. For example, in the exemplary configurations shown in FIG. 1 and FIG. 2, the ink jet heads 34Y, 34M, 34C and 34K are arrayed in this order from upstream with respect to the sheet carrying direction of the carrying belt 33.

The ink jet head 34Y is an ink jet head that ejects decolorable yellow (Y) ink. The ink jet head 34M is an ink jet head that ejects decolorable magenta (M) ink. The ink jet head 34C is an ink jet head that ejects decolorable cyan (C) ink. The ink jet head 34K is an ink jet head that ejects decolorable black (Bk) ink.

The ink jet heads 34Y, 34M, 34C and 34K form images of the corresponding colors on a sheet. The ink jet heads 34Y, 34M and 34C eject ink corresponding to yellow components, magenta components and cyan components, respectively, in a color image. The ink jet head group 34 superimposes and thus prints the images of the respective colors on a sheet and thereby forms a color image on the sheet.

Next, the configuration of a control system in the digital multi-function peripheral 1 will be described.

FIG. 3 shows an exemplary configuration of the control system of the digital multi-function peripheral 1.

A main control unit 50 shown in FIG. 3 comprehensively controls the digital multi-function peripheral 1. The main control unit 50 controls the printer 2, the scanner 3, the finisher 4, the operation unit 5, the scanner 23 and so on, as processing units of the digital multi-function peripheral 1. In the main control unit 50, various kinds of data processing such as arithmetic processing and determination processing are carried out as well.

The main control unit 50 has a system processor 51, a system controller 52, a system ROM 53, a system memory 54, an image processor 55, a page memory 56, a storage interface 57, an HDD 58, an external interface 59, and a system bus 60.

The system processor 51 carries out various kinds of data processing. The system processor 51 executes control programs stored in the system memory 54 or the HDD 58 and thereby realizes various kinds of processing. The system controller 52 controls each unit. The system controller 52 is connected to the system bus 60. The system processor 51 is connected to the system bus 60 via the system controller 52. The system processor 51 and the system controller 52 are responsible for controlling the entire digital multi-function peripheral.

The system ROM 53 is a non-rewritable non-volatile memory. The system ROM 53 stores, for example, a control program and control data for controlling the digital multi-function peripheral. The system memory 54 includes a RAM which temporarily stores work data or stores reference data, and a rewritable non-volatile memory which saves system setting information.

The image processor 55 carries out various kinds of image processing on image data. The image processor 55 is connected to the system bus 60. The image processor 55 carries out image processing such as correction, compression and expansion of image data. For example, in the case of copying, the image processor 55 carries out image processing such as shading correction, gradation correction and inter-line correction on image data scanned by the scanner 3.

The page memory 56 is a memory having a storage area in which image data for at least one page is developed. The page memory 56 is connected to the system bus 60 via the image processor 55. The HDD 58 is connected to the system bus 60 via the storage interface 57. The HDD 58 is a large-capacity storage device capable of storing image data and so on. The HDD 58 may also store various kinds of setting data and management data.

The external interface 59 is an interface for connection with an external device. For example, the external interface 59 is an interface for data communication with an external device connected to a local area network (LAN) via a network cable or wireless communication. If the digital multi-function peripheral functions as a network printer, the external interface 59 receives image data for printing from an external device.

The printer 2, the scanner 3, the finisher 4, the operation unit 5 and the scanner 23 are connected to the system controller 52 via the system bus 60.

Next, a first example of operation in the digital multi-function peripheral will be described.

In the first example of operation, reuse information is printed together with a print target image. The reuse information is printed in an optimum area in the print target image, instead of a fixed area. In short, in the first example of operation, a print area for reuse information is selected in the state of a print target image, and the reuse information is printed in an overlapping manner in the selected print area in the image.

Figure 4:
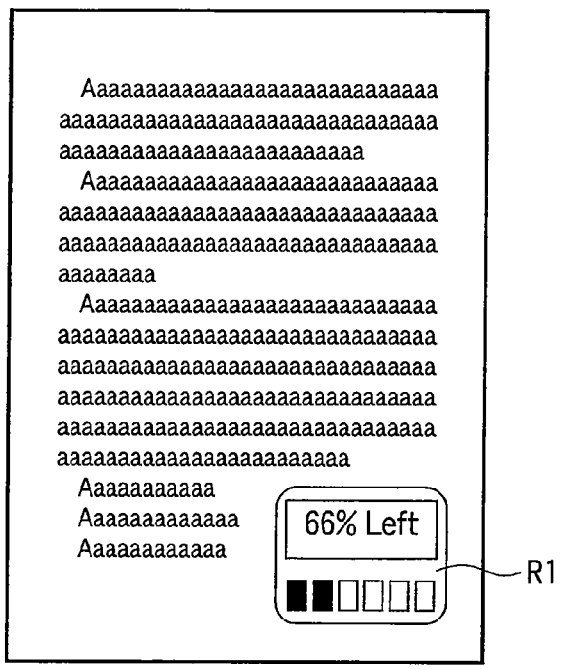
FIG. 4 shows an exemplary print of an image combined with reuse information.
Figure 5:
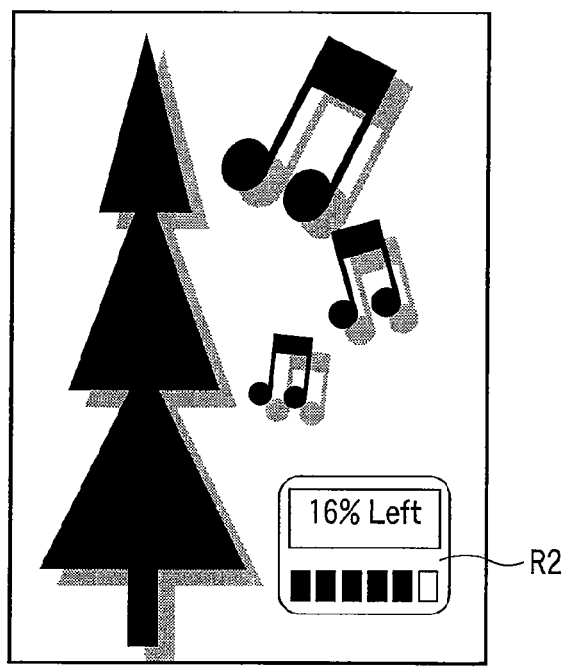
FIG. 5 shows an exemplary print of an image combined with reuse information.

FIG. 4 and FIG. 5 show exemplary prints of reuse information.

FIG. 4 shows an example in which reuse information (image data representing reuse information) R1 is printed in an overlapping manner in a character image.

In a document image as shown in FIG. 4, it is highly probable that there is an area with no character image (pixels) printed therein. Such an area with no character image printed therein is suitable as a print area to print reuse information in. As it is determined whether or not a print area for reuse information can be secured in an area where printing is not carried out in a print target image, a print area for reuse information can be selected. In the example shown in FIG. 4, the bottom right area in the image is a print area for reuse information.

FIG. 5 shows an example in which reuse information (image data representing reuse information) R2 is printed in an overlapping manner in a photographic image.

In the photographic image as shown in FIG. 5, pixels are distributed over the entire image. In short, a photographic image has few areas where pixels are not printed. Therefore, in a photographic image, an area consisting of light-colored pixels (an area consisting of low-density pixels) is suitable as print area to print reuse information in. As it is determined whether or not a print area for reuse information can be secured in a light-colored area in a print target image, a print area for reuse information can be selected. In the example shown in FIG. 5, the bottom right area in the image is a print area for reuse information.

The reuse information R1 shown in FIG. 4 and the reuse information R2 shown in FIG. 5 explicitly show information indicating the remaining quantity of printing based on a limit value that is prescribed as reusable. For example, the reuse information R1 and R2 show the remaining quantity of printing in the form of numeric values (percentages) and also show a confirmation section indicating the number of times printing is already done and the remaining number of times with respect to the number of times of reusability.

However, reuse information can be realized in various formats. For example, it is possible to show only the remaining number of times as reuse information so that the print area is smaller. Reuse information may include not only the remaining quantity of printing but also information about toner, information indicating whether the print target is a confidential document or not, information about the image forming apparatus that carries out printing, information indicating the date and time of printing, or information about the printed image (for example, information indicating color, monochrome, character image, photographic image or the like).

As processing to select a print area for reuse information, it may be determined whether or not there is an area that can be secured for reuse information in order from a default position in the entire image (for example, a bottom right in the image). In this case, it is possible to give priority to the default position in selecting an area to be used as a print area for reuse information. Consequently, since the print area for reuse information is concentrated at the bottom right in a sheet printed in the digital multi-function peripheral 1, the user can visually recognize the reuse information printed on the sheet. However, the print area for reuse information need not be a rectangular area as shown in FIG. 4 and FIG. 5. For example, the print area for reuse information may be flexibly modified in accordance with the state of the area where no image is printed or the light-colored area in the print target image.

Figure 6:
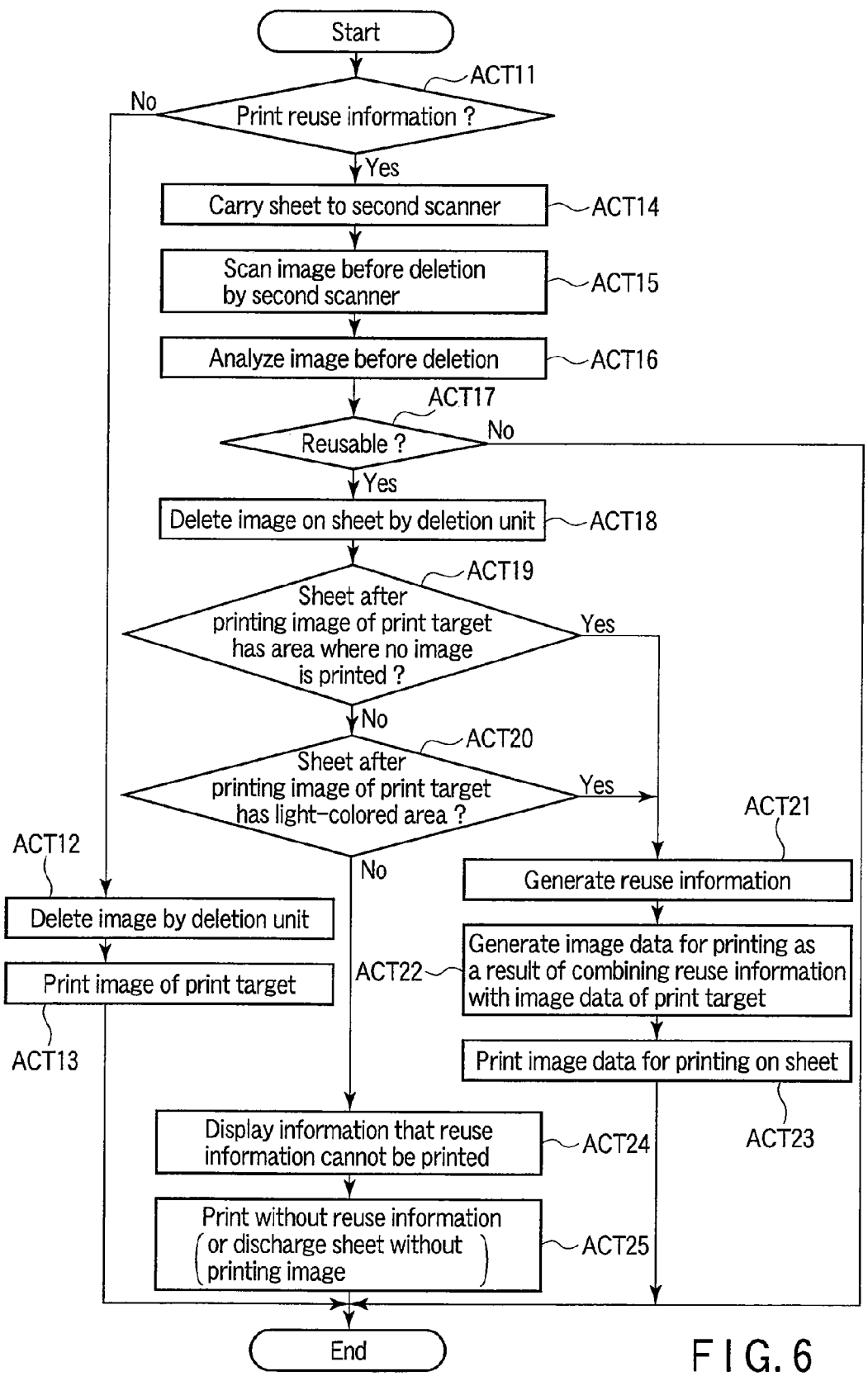
FIG. 6 is a flowchart for explaining the flow of a first example of operation.

FIG. 6 is a flowchart for explaining the flow of the first example of operation.

First, the user sets whether or not to print reuse information on a sheet. The user can designate whether reuse information is needed or not, using the operation unit 5. Information indicating whether reuse information is needed or not, designated by the user, is saved in the system memory 54 as setting information.

If a print target image is provided, the main control unit 50 determines whether or not reuse information needs to be printed together with the print target image (ACT 11). This print target image is stored in the page memory 56. For example, in copying, an image scanned by the scanner 3 is a print target image. In copying, the image processor 55 stores the image scanned by the scanner 3 into the page memory 56 as image data of the print target.

If it is determined as a result of the above determination that the reuse information need not be printed (NO in ACT 11), the main control unit 50 carries out normal printing. As normal printing, the printer 2 deletes an image on a sheet by using the deletion unit 24 (ACT 12) and prints the print target image on the sheet by using the image forming unit 25 (ACT 13).

If it is determined as a result of the above determination that the reuse information needs to be printed (YES in ACT 11), the main control unit 50 checks a sheet on which the image is to be printed (ACT 14 to ACT 17). The carrying mechanism 22 or the carrying mechanism 22*a* in the printer 2 supplies one sheet of paper from the cassette 21 or the paper supply tray 41. The carrying mechanism 22 or the carrying mechanism 22*a* in the printer 2 carries the supplied sheet to the scanner 23 as the second scanner installed in the printer 2 (ACT 14). The scanner 23 scans the image before deletion, printed on the sheet carried by the carrying mechanism 22 or 22*a* (ACT 15). The scanner 23 supplies the scanned image to the image processor 55 of the main control unit 50. The image processor 55 analyzes the image before deletion, scanned by the scanner 23 (ACT 16). The image processor 55 recognizes the reuse information from the image before deletion. For example, the image processor 55 extracts an area that seems to contain the reuse information, and then carries out character recognition of the extracted area, thereby recognizing the reuse information.

If the reuse information of the sheet is successfully recognized, the system processor 51 of the main control unit 50 determines whether the sheet is reusable or not, on the basis of the reuse information acquired as a result of the recognition (ACT 17). For example, the reuse information may include information indicating whether a erasable image forming material (ink, toner or the like) is used or not, the cumulative number of times of printing, the cumulative number of times of reuse, the remaining number of times reuse is possible, or information indicating whether a confidential document is handled or not.

For example, the system processor 51 determines that the sheet is non-reusable if the image printed on the sheet is not an image formed with a erasable image forming material, if the cumulative number of times of printing (the number of times of reuse or the remaining number of times) with respect to the sheet exceeds the number of times reuse is possible, or if the image printed on the sheet is a confidential document. The system controller 51 may also determine that the sheet is non-reusable if the reuse information is not successfully recognized.

If it is determined as a result of the above determination that the sheet is not reusable (NO in ACT 17), the main control unit 50 discharges the sheet and supplies the next sheet instead. If the next sheet is supplied, the main control unit 50 executes processing starting from ACT 14 on the next sheet as well.

If it is determined as a result of the above determination that the sheet is reusable (YES in ACT 17), the printer 2 deletes the image on the sheet by using the deletion unit 24 (ACT 18). If it is determined as a result of determination that the sheet is reusable (YES in ACT 17), the main control unit 50 carries out processing in which the image processor 55 selects an area where the reuse information can be printed (print area for reuse information) from the print target image stored in the page memory 56 (ACTs 19 and 20).

In the processing to select a print area for reuse information, first, the image processor 55 selects an area usable as a print area for reuse information from the area where no image is printed, in the print target image stored in the page memory 56 (ACT 19).

If there is no area usable as a print area for reuse information where no image is printed (NO in ACT 19), the image processor 55 further selects an area usable as a print area for reuse information from a light-colored area (with a small density value) in the print target image stored in the page memory 56 (ACT 20). Here, the light-colored area is an area where reuse information can be printed in an overlapping manner. For example, the main control unit 50 sets in advance a threshold value for the density value of each pixel (or the average density value in an area including plural pixels). On the basis of the threshold value, the image processor 55 determines whether the density is low or not.

If an area usable as a print area for reuse information where no image is printed is successfully selected (YES in ACT 19), or if a light-colored area usable as a print area for reuse information is successfully selected (YES in ACT 20), the image processor 55 generates image data representing reuse information that is decided on the basis of the reuse information before deletion and the print target image data (ACT 21). The reuse information to be printed includes, for example, information (for example, the remaining number of times of reuse or information indicating the cumulative value of the quantity of printing (deletion)) calculated on the basis of the reuse information recognized from the image before deletion by the system processor 51 and the information about the print target image data.

As the image data representing the reuse information is generated, the image processor 55 combines the image data representing the reuse information with the image data of the print target stored in the page memory 56 in accordance with the information indicating the print area for reuse information selected in ACT 19 or ACT 20 (ACT 22). The image data acquired as a result of combining the reuse information with the image data of the print target is image data for printing that is to be printed on the sheet.

As the image data for printing is completed, the main control unit 50 requests the printer 2 to start printing via the system controller 52 and supplies the image data for printing. In response to the request to start printing, the printer 2 prints the image data for printing on the sheet from which the image is deleted by the deletion unit 24 (ACT 23).

If the print target image includes no light-colored area usable as a print area for reuse information (NO in ACT 20), that is, if no print area for reuse information can be selected, the main control unit 50 displays information that the reuse information cannot be printed, on the display unit 5*a* of the operation unit 5 via the system controller 52 (ACT 24). If the information that the reuse information cannot be printed is displayed, the main control unit 50 prints the print target image without the reuse information on the sheet (ACT 25). In this case, the main control unit 50 requests the printer 2 to start printing via the system controller 52 and supplies the image data not combined with the reuse information, as image data for printing. In response to the request to start printing, the printer 2 prints the image data for printing on the sheet from which the image is deleted by the deletion unit 24.

As the processing of ACT 25, the main control unit 50 may discharge the sheet without printing the print target image, either.

Also, as the processing of ACT 25, the main control unit 50 may reduce the image data representing the reuse information and determine whether or not there is an area where the reduced displayed reuse information (or the reuse information with part of its information omitted) can be printed, via the processing similar to ACTs 19 and 20. If there is an area where the reduced reuse information can be printed, the main control unit 50 may print the image data for printing combined with the reduced reuse information on the sheet.

If the digital multi-function peripheral has the function of double-side printing, the main control unit 50 may print the reuse information on the opposite side of the print side of the sheet, instead of the processing of ACT 25. For example, in the case of printing the print target image on the face side of the sheet, the image data representing the reuse information may be printed on the back side of the sheet.

Moreover, the user may be allowed to select a content of the processing of ACT 25. The selection of the processing content by the user can be realized by displaying, on the display unit 5*a*, the information that the reuse information cannot be printed and a guide indicating that a processing content on the sheet should be selected, in ACT 24. In this case, processing contents that can be selected by the user include image printing without reuse information, print suspension (discharge of sheet without printing), printing of reduced reuse information (or reuse information with part of its information omitted), or printing of reuse information on the opposite side of the image print side.

In the first example of operation, the digital multi-function peripheral selects an area where no image is printed or a light-colored area in a print target image, and then prints reuse information therein. According to the first example of operation, visible reuse information can be printed without deteriorating a print target image as a print result printed on a sheet.

Next, a second example of operation in the digital multi-function peripheral will be described.

In this second example of operation, the print rate (cumulative print rate or remaining print rate) is provided as reuse information. In short, in the second example of operation, the print rate indicating the quantity of printing carried out up to the present is accumulated. Thus, reuse information corresponding to the cumulative value of the quantity of printing that is actually carried out is printed on a sheet, instead of simply printing the number of time of printing. As a method of printing reuse information on a sheet, reuse information may be printed at a fixed position on a sheet, or the above first example of operation may be employed.

Figure 7:
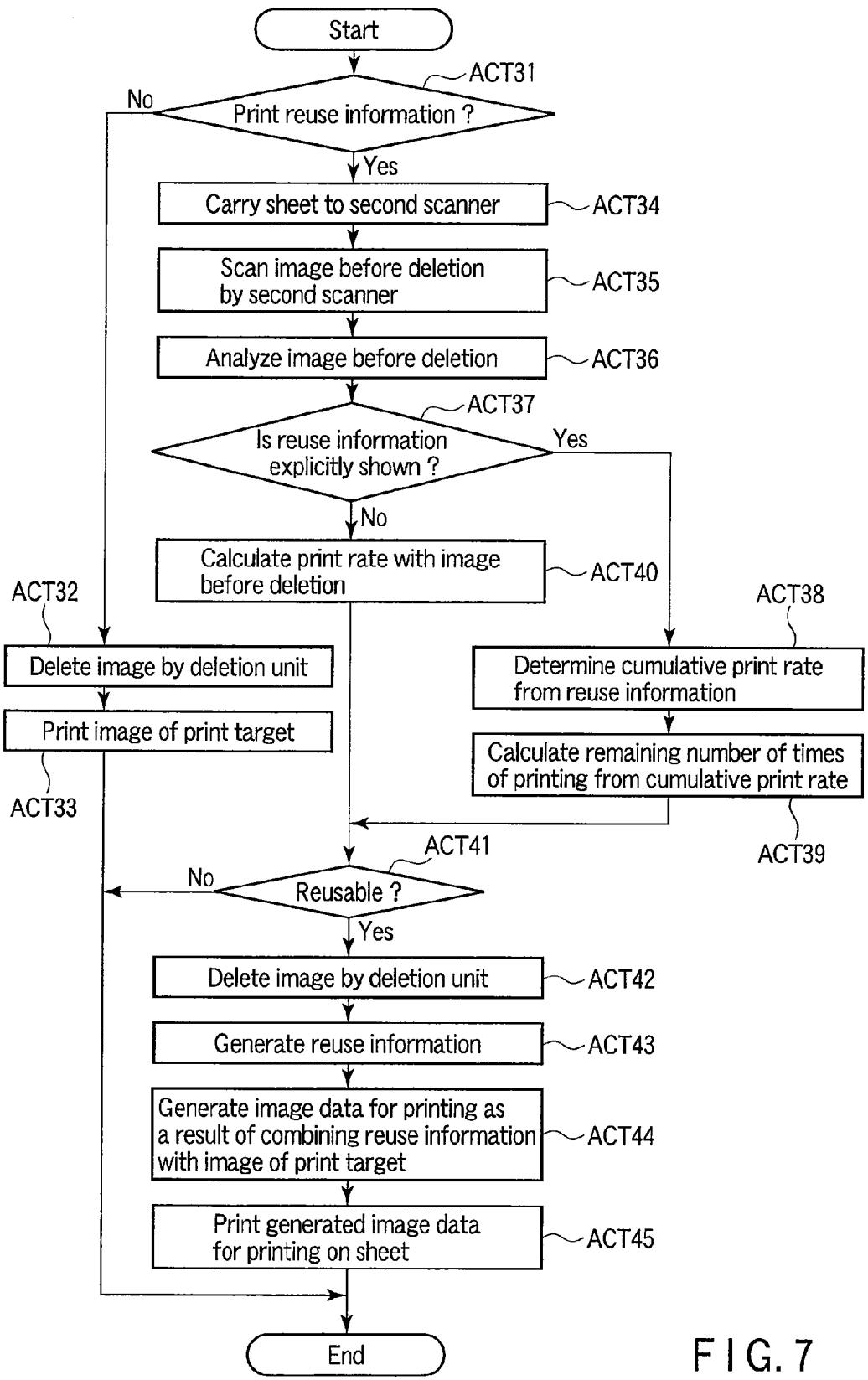
FIG. 7 is a flowchart for explaining the flow of a second example of operation.

FIG. 7 is a flowchart for explaining the flow of the second example of operation.

First, the user sets whether reuse information needs to be printed on a sheet or not. The user can designate whether reuse information is needed or not, using the operation unit 5. Information indicating whether reuse information is needed or not, designated by the user, is saved in the system memory 54 as setting information.

If a print target image is provided, the main control unit 50 determines whether or not reuse information needs to be printed together with the print target image (ACT 31).

If it is determined as a result of the above determination that the reuse information need not be printed (NO in ACT 31), the main control unit 50 carries out normal printing. As normal printing, the printer 2 deletes an image on a sheet by using the deletion unit 24 (ACT 32) and prints the print target image on the sheet by using the image forming unit 25 (ACT 33).

If it is determined as a result of the above determination that the reuse information needs to be printed (YES in ACT 31), the main control unit 50 checks a sheet on which the image is to be printed (ACT 34 to ACT 41). The carrying mechanism 22 or the carrying mechanism 22*a* in the printer 2 supplies one sheet of paper from the cassette 21 or the paper supply tray 41. The carrying mechanism 22 or 22*a* in the printer 2 carries the supplied sheet to the scanner 23 as the second scanner installed in the printer 2 (ACT 34).

The scanner 23 scans the image before deletion, printed on the sheet carried by the carrying mechanism 22 or 22*a* (ACT 35). The scanner 23 supplies the scanned image to the image processor 55 of the main control unit 50. The image processor 55 analyzes the image before deletion, scanned by the scanner 23 (ACT 36). The image processor 55 recognizes the reuse information from the image before deletion. For example, the image processor 55 extracts an area that seems to contain the reuse information, and then carries out character recognition of the extracted area, thereby recognizing the reuse information.

If the reuse information of the sheet is successfully recognized (YES in ACT 37), the system processor 51 of the main control unit 50 determines the cumulative print rate (cumulative quantity of printing) on the sheet in accordance with print rate information included in the reuse information (ACT 38). For example, it is assumed that reuse reaches a limit when the cumulative print rate is 100%. If the limit value of the cumulative print rate is 100%, a reusable sheet has a cumulative print rate lower than 100%. As the cumulative print rate on the sheet is determined, the system processor 51 calculates the remaining number of times of printing based on the cumulative print rate (ACT 39). For example, the system processor 51 calculates the remaining number of times of printing based on the cumulative print rate and the print rate per printing (print rate for presumed one print). The print rate per printing may be a preset fixed value or may be a value calculated from the cumulative print rate and the cumulative number of times of printing (or the number of times of reuse).

If the reuse information of the sheet is not successfully recognized (NO in ACT 37), the system processor 51 of the main control unit 50 calculates the print rate with the image before deletion from the image before deletion scanned by the scanner 23 (ACT 40). For example, in some digital multi-function peripherals, sheets for reuse and new sheets are separately housed. In a digital multi-function peripheral of such a type, it is possible that reuse information is not printed in the first printing on a new sheet. In such a digital multi-function peripheral, reuse information is not printed on a sheet on which printing is carried out only once. For such a sheet, the print rate can be calculated from the image before deletion scanned by the scanner 23, in ACT 40.

As the cumulative print rate and the remaining number of times of printing are calculated, the system processor 51 of the main control unit 50 determines whether the sheet is reusable or not (ACT 41). For example, if the cumulative print rate is lower than 100%, the system processor 51 may determine that the sheet is reusable. Alternatively, if the cumulative print rate is equal to or higher than a reference value (for example, 90% or higher) even if the cumulative print rate is lower than 100%, the system processor 51 may determine that the sheet is non-usable. As the reusability is determined on the basis of the cumulative print rate, the quantity of the image printed on the sheet can be maintained.

If it is determined as a result of the above determination that the sheet is non-reusable (NO in ACT 41), the main control unit 50 discharges the sheet and supplies the next sheet instead. If the next sheet is supplied, the main control unit 50 may execute the processing starting from ACT 34 on the next sheet as well.

If it is determined as a result of the above determination that the sheet is reusable (YES in ACT 41), the printer 2 deletes the image on the sheet by using the deletion unit 24 (ACT 42). Also, if it is determined as a result of determination that the sheet is reusable (YES in ACT 41), the main control unit 50 generates reuse information to be printed on the sheet (ACT 43) and the image processor 55 combines the reuse information with the print target image stored in the page memory 56 (ACT 44). The combined image data (image data for printing) is printed on the sheet (ACT 45).

As the reuse information to be printed on the sheet, the system processor 51 calculates a cumulative print rate by adding the print rate with the image data of the print target to the print rate determined in ACT 38 or the print rate calculated in ACT 40. As the cumulative print rate to be printed is calculated, the image processor 55 generates image data representing the reuse information including the cumulative print rate calculated by the system processor 51 (ACT 43).

As the image data representing the reuse information is generated, the image processor 55 combined the image data representing the reuse information with the print target image stored in the page memory 56 (ACT 44). In this combination, the image data representing the reuse information may be superimposed on a fixed position in the print target image or may be superimposed on the print area for reuse information selected in the processing in the first example of operation. The image data acquired as a result of combining the reuse information with the image data of the print target is image data for printing to be printed on the sheet.

As the image data for printing is completed, the main control unit 50 requests the printer 2 to start printing via the system controller 52 and supplies the image data for printing. In response to the request to start printing, the printer 2 prints the image data for printing on the sheet from which the image is deleted by the deletion unit 24 (ACT 45).

In the second example of operation, the digital multi-function peripheral prints, on a sheet, an image acquired as a result of combining reuse information indicating a cumulative print rate with a print target image. According to the second example of operation, reuse information to be printed on a sheet enables recognition of the quantity of printing that is actually carried out, instead of simply recognizing the number of times of printing. It is possible to control reuse according to the actual status of use.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An image forming apparatus comprising:
   an image acquisition unit configured to acquire a print target image;
   a scanner configured to scan an image on a sheet;
   a recognition unit configured to recognize a previous reuse information from the image scanned by the scanner;
   a generation unit configured to generate a revised reuse information based on the previous reuse information recognized by the recognition unit;
   a selection unit configured to select, in the print target image acquired by the image acquisition unit, an area where the revised reuse information can be printed;
   a combination unit configured to create a combined image containing:
      the print target image, and
      the revised reuse information in the area selected by the selection unit;
   a deletion unit configured to delete the image on the sheet from which the image is scanned by the scanner; and
   an image forming unit configured to print, with a deletable image forming material:
      the combined image on the sheet from which the image is deleted by the deletion unit if an area where the revised reuse information can be printed can be selected in the print target image by the selection unit, and
      the print target image without the revised reuse information on the sheet from which the image is deleted by the deletion unit if an area where the revised reuse information can be printed cannot be selected in the print target image by the selection unit.

2. The apparatus according to claim 1, wherein the selection unit is configured to select an area where the revised reuse information can be printed, from an area where no image is printed in the print target image.

3. The apparatus according to claim 1, wherein the selection unit is configured to select an area where the revised reuse information can be printed, from a light-colored area in the print target image.

4. The apparatus according to claim 1, wherein the selection unit is configured to select an area where the revised reuse information can be printed, from an area where no image is printed in the print target image, and
   if an area where the revised reuse information can be printed cannot be selected from the area where no image is printed, the selection unit is configured to select an area where the revised reuse information can be printed, from a light-colored area in the print target image.

5. The apparatus according to claim 1, further comprising a display unit configured to display, if an area where the revised reuse information can be printed cannot be selected by the selection unit, information that there is no area to print the revised reuse information in.

6. The apparatus according to claim 1, further comprising a display unit configured to display, if an area where the revised reuse information can be printed cannot be selected by the selection unit, guide showing that there is no area to print the revised reuse information in and that a processing on the sheet is to be selected, and
   wherein, if the processing is selected for printing the print target image on the sheet without the revised reuse information, the image forming unit is configured to print the print target image on the sheet without the revised reuse information.

7. An image forming apparatus comprising:
   an image acquisition unit configured to acquire a print target image;
   a scanner configured to scan an image on a sheet;
   a recognition unit configured to recognize a previous reuse information from the image scanned by the scanner;
   a generation unit configured to generate a revised reuse information based on the previous reuse information recognized by the recognition unit;
   a selection unit configured to select, in the print target image acquired by the image acquisition unit, an area where the revised reuse information can be printed;
   a combination unit configured to create a combined image containing:
      the print target image, and
      the revised reuse information in the area selected by the selection unit;

a deletion unit configured to delete the image on the sheet from which the image is scanned by the scanner; and an image forming unit configured to:
- print, with a deletable image forming material, the combined image on the sheet from which the image is deleted by the deletion unit if an area where the revised reuse information can be printed can be selected in the print target image by the selection unit, and
- discharge the sheet without printing the image, if an area where the revised reuse information can be printed cannot selected in the print target image by the selection unit.

8. The apparatus according to claim 7, further comprising a display unit configured to display, if an area where the revised reuse information can be printed cannot be selected by the selection unit, guide showing that there is no area to print the revised reuse information in and that a processing on the sheet is to be selected, and wherein, if the processing is selected for print suspension, the image forming unit is configured to discharge the sheet without printing the image.

9. An image forming apparatus comprising:
an image acquisition unit configured to acquire a print target image;
a scanner configured to scan an image on a sheet;
a recognition unit configured to recognize a previous reuse information from the image scanned by the scanner;
a generation unit configured to generate a revised reuse information based on the previous reuse information recognized by the recognition unit;
a selection unit configured to select, in the print target image acquired by the image acquisition unit, an area where the revised reuse information can be printed;
a combination unit configured to create a combined image containing:
  the print target image, and
  the revised reuse information in the area selected by the selection unit;
a deletion unit configured to delete the image on the sheet from which the image is scanned by the scanner;
an image forming unit configured to print, with a deletable image forming material, the combined image on the sheet from which the image is deleted by the deletion unit; and
a display unit configured to display, if an area where the revised reuse information can be printed cannot be selected by the selection unit, a guide showing that there is no area to print the revised reuse information in and that a processing on the sheet is to be selected.

10. The apparatus according to claim 9, wherein:
the selection unit is further configured to, if an area where the revised reuse information can be printed cannot be selected in the print target image, select an area in the print target image where the revised reuse information generated by the generation unit can be printed in a reduced state, and
the combination unit is further configured to, if an area in the print target image where the revised reuse information can be printed in a reduced state can be selected, generate a combined image based on:
  the print target image, and
  the revised reuse information in the reduced state in the area selected by the selection unit.

11. The apparatus according to claim 9, wherein the revised reuse information includes information for determining whether the sheet is reusable or not.

12. The apparatus according to claim 9, wherein the revised reuse information includes information indicating a remaining number of times of printing on the sheet.

13. The apparatus according to claim 9, wherein the revised reuse information includes information indicating whether the image on the sheet is erasable or not.

14. The apparatus according to claim 9, wherein the revised reuse information includes information indicating a cumulative quantity of printing on the sheet.

15. The apparatus according to claim 9, further comprising a determination unit configured to determine whether the sheet is reusable or not, based on the previous reuse information recognized by the recognition unit,
wherein if the determination unit determines that the sheet is not reusable, the image forming unit is configured to discharge the sheet without forming any image.

16. A control method for an image forming apparatus comprising:
acquiring a print target image;
scanning an image on a sheet;
recognizing previous reuse information in the image scanned from the sheet;
generating revised reuse information based on the recognized previous reuse information;
determining if there is an area in the acquired print target image where the revised reuse information can be printed;
combining the acquired print target image and the revised reuse information in the determined area if it is determined that there is an area in the acquired print target image where the revised reuse information can be printed;
deleting the image on the sheet from which the image is scanned;
printing the combined image on the sheet from which the image is deleted, with a deletable image forming material, if it is determined that there is an area in the acquired print target image where the revised reuse information can be printed; and
printing the print target image on the sheet without the revised reuse information, if it is determined that there is no area in the acquired print target image where the revised reuse information can be printed.

17. The method according to claim 16, further comprising:
displaying a guide showing that there is no area to print the revised reuse information in and that a processing on the sheet is to be selected, if it is determined that there is no area in the acquired print target image where the revised reuse information can be printed; and
accepting a selection for processing on the sheet for printing the print target image on the sheet without the revised reuse information.

18. A control method for an image forming apparatus comprising:
acquiring a print target image;
scanning an image on a sheet;
recognizing previous reuse information in the image scanned from the sheet;
generating revised reuse information based on the recognized previous reuse information;
determining if there is an area in the acquired print target image where the revised reuse information can be printed;
combining the acquired print target image and the revised reuse information in the determined area if it is determined that there is an area in the acquired print target image where the revised reuse information can be printed;

deleting the image on the sheet from which the image is scanned;

printing the combined image on the sheet from which the image is deleted, with a deletable image forming material, if it is determined that there is an area in the acquired print target image where the revised reuse information can be printed; and discharging the sheet without printing an image, if it is determined that there is no area where the revised reuse information can be printed.

19. The method according to claim 18, further comprising:

displaying a guide showing that there is no area to print the revised reuse information in and that a processing on the sheet is to be selected, if it is determined that there is no area in the acquired print target image where the revised reuse information can be printed; and accepting a selection for processing on the sheet for discharging the sheet.

* * * * *